United States Patent
Arimilli et al.

(10) Patent No.: US 8,214,603 B2
(45) Date of Patent: Jul. 3, 2012

(54) METHOD AND APPARATUS FOR HANDLING MULTIPLE MEMORY REQUESTS WITHIN A MULTIPROCESSOR SYSTEM

(75) Inventors: Lakshminarayana B. Arimilli, Austin, TX (US); Ravi K. Arimilli, Austin, TX (US); Guy L. Guthrie, Austin, TX (US); William J. Starke, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 981 days.

(21) Appl. No.: 12/024,181

(22) Filed: Feb. 1, 2008

(65) Prior Publication Data

US 2009/0198933 A1    Aug. 6, 2009

(51) Int. Cl.
*G06F 12/00* (2006.01)
*G06F 13/00* (2006.01)

(52) U.S. Cl. ........ 711/147; 711/145; 711/152; 711/163; 711/E12.001; 707/704

(58) Field of Classification Search .................. None
See application file for complete search history.

(56) References Cited

U.S. PATENT DOCUMENTS

| | | | |
|---|---|---|---|
| 5,179,669 A | | 1/1993 | Peters |
| 5,206,946 A | * | 4/1993 | Brunk ............... 710/2 |
| 5,263,155 A | * | 11/1993 | Wang .............. 707/704 |
| 5,353,425 A | | 10/1994 | Malamy et al. |
| 5,487,162 A | * | 1/1996 | Tanaka et al. ........ 711/145 |
| 6,393,533 B1 | | 5/2002 | Mende et al. |
| 6,460,124 B1 | | 10/2002 | Kagi et al. |
| 6,490,662 B1 | | 12/2002 | Pong et al. |
| 6,546,443 B1 | | 4/2003 | Kakivaya et al. |
| 6,622,189 B2 | | 9/2003 | Bryant et al. |
| 6,633,960 B1 | | 10/2003 | Kessler et al. |
| 6,801,986 B2 | | 10/2004 | Steely, Jr. et al. |
| 7,058,948 B2 | | 6/2006 | Hoyle |
| 2003/0088755 A1 | | 5/2003 | Gudmunson et al. |
| 2003/0126381 A1 | | 7/2003 | Vo |
| 2004/0039962 A1 | | 2/2004 | Ganesh et al. |
| 2004/0073905 A1 | | 4/2004 | Emer et al. |
| 2004/0073909 A1 | * | 4/2004 | Arimilli et al. ............ 718/105 |

(Continued)

OTHER PUBLICATIONS

"Shared Memory Addressing Structure," Aug. 1978, IBM Technical Disclosure Bulletin, vol. 21 iss. 3, pp. 998-1000.*

(Continued)

*Primary Examiner* — Michael Krofcheck
(74) *Attorney, Agent, or Firm* — Yudell Isidore Ng Russell PLLC

(57) ABSTRACT

A method for handling multiple memory requests within a multi-processor system is disclosed. A lock control section is initially assigned to a data block within a system memory. In response to a request for accessing the data block by a processing unit, a determination is made whether or not the lock control section of the data block has been set. If the lock control section has been set, another determination is made whether or not the requesting processing unit is located beyond a predetermined distance from a memory controller. If the requesting processing unit is located beyond a predetermined distance from the memory controller, the requesting processing unit is invited to perform other functions; otherwise, the number of the requesting processing unit is placed in a queue table. However, if the lock control section has not been set, the lock control section of the data block is set, and the access request is allowed.

4 Claims, 3 Drawing Sheets

U.S. PATENT DOCUMENTS

| | | | |
|---|---|---|---|
| 2004/0143712 A1* | 7/2004 | Armstrong et al. | 711/152 |
| 2004/0181636 A1 | 9/2004 | Martin et al. | |
| 2004/0186988 A1* | 9/2004 | Polyudov | 713/100 |
| 2005/0033948 A1* | 2/2005 | Wei | 713/1 |
| 2006/0218382 A1* | 9/2006 | Chen | 712/225 |
| 2007/0094430 A1* | 4/2007 | Speier et al. | 710/200 |
| 2007/0204121 A1 | 8/2007 | O'Connor et al. | |
| 2008/0235690 A1 | 9/2008 | Ang et al. | |
| 2009/0198849 A1 | 8/2009 | Arimilli et al. | |
| 2009/0198916 A1 | 8/2009 | Arimilli et al. | |
| 2009/0198920 A1 | 8/2009 | Arimilli et al. | |

OTHER PUBLICATIONS

Krofcheck, M.—Advisory Action, U.S. Appl. No. 12/024,223, filed Aug. 22, 2011.

Patel, K.—Final Office Action, U.S. Appl. No. 12/024,245, dated Apr. 26, 2011.

Patel, K.—Examiner's Answer, U.S. Appl. No. 12/024,234, dated May 3, 2011.

Krofcheck, M.—Final Office Action, U.S. Appl. No. 12/024,223, dated Jun. 1, 2011.

Patel, K.—Non-final Office Action, U.S. Appl. No. 12/024,234, dated Jul. 19, 2010.

Patel, K.—Final Office Action, U.S. Appl. No. 12/024,234, dated Nov. 24, 2010.

Krofcheck, M.—Non-final Office Action, U.S. Appl. No. 12/024,223, dated Dec. 28, 2010.

Khakhar, N.—Non-final Office Action, U.S. Appl. No. 12/024,169, dated Jun. 23, 2010.

Khakhar, N.—Final Office Action, U.S. Appl. No. 12/024,169, dated Nov. 17, 2010.

Rajwar et al.—'Inferential Queueing and Speculative Push for Reducing Critical Communication Latencies'; 12 pp; Microprocessor Research Labs, Intel Corporation and Dept. of Computer Sciences, Univ. of Wisconsin-Madison, WI; ICS'03, Jun. 23-26, 2003, San Francisco, CA.

Patel, K.—Nonfinal Office Action dated Nov. 26, 2010, U.S. Appl. No. 12/024,245.

* cited by examiner

METHOD AND APPARATUS FOR HANDLING MULTIPLE MEMORY REQUESTS WITHIN A MULTIPROCESSOR SYSTEM

This invention was made with United States Government support under Agreement number HR0011-07-9-0002 awarded by DARPA. The Government has certain rights in the invention.

RELATED PATENT APPLICATIONS

The present patent application is related to copending applications:
1. U.S. Ser. No. 12/024,169, filed on even date;
2. U.S. Ser. No. 12/024,223, filed on even date;
3. U.S. Ser. No. 12/024,234, filed on even date; and
4. U.S. Ser. No. 12/408,368, filed on even date.

BACKGROUND OF THE INVENTION

1. Technical Field

The present invention relates to multiprocessor systems in general, and in particular to memory controllers for multiprocessor systems. Still more particularly, the present invention relates to a method and apparatus for supporting low-overhead memory locks within a multiprocessor system.

2. Description of Related Art

A multiprocessor system typically requires a mechanism for synchronizing operations of various processors within the multiprocessor system in order to allow interactions among those processors that work on a task. Thus, the instruction set of processors within a multiprocessor system are commonly equipped with explicit instructions for handling task synchronization. For example, the instruction set of PowerPC® processors, which are manufactured by International Business Machines Corporation of Armonk, N.Y., provides instructions such as lwarx or ldwarx and stwcx or stdwx (hereafter referred to as larx and stcx, respectively) for building synchronization primitives.

The larx instruction loads an aligned word of memory into a register within a processor. In addition, the larx instruction places a "reservation" on the block of memory that contains the word of memory accessed. The reservation contains the address of the memory block and a flag. The flag is made active, and the address of the memory block is loaded when a larx instruction successfully reads the word of memory referenced. If the reservation is valid (i.e., the flag is active), the processor and the memory hierarchy are obligated to monitor the entire processing system cooperatively for any operation that attempts to write to the memory block at which the reservation exists.

The reservation flag is used to control the behavior of a stcx instruction that is the counterpart to the larx instruction. The stcx instruction first determines if the reservation flag is valid. If so, the stcx instruction performs a Store to the word of memory specified, sets a condition code register to indicate that the Store has succeeded, and resets the reservation flag. If, on the other hand, the reservation flag in the reservation is not valid, the stcx instruction does not perform a Store to the word of memory and sets a condition code register indicating that the Store has failed. The stcx instruction is often referred to as a "Conditional Store" due to the fact that the Store is conditional on the status of the reservation flag.

The general concept underlying the larx/stcx instruction sequence is to allow a processor to read a memory location, to modify the memory location in some way, and to store the new value to the memory location while ensuring that no other processor within a multiprocessor system has altered the memory location from the point in time when the larx instruction was executed until the stcx instruction completes. Such a sequence is usually referred to as an "atomic read-modify-write" sequence because a processor was able to read a memory location, modify a value within the memory location, and then write a new value without any interruption by another processor writing to the same memory location. The larx/stcx sequence of operations do not occur as one uninterruptable sequence, but rather, the fact that the processor is able to execute a larx instruction and then later successfully complete the stcx instruction ensures a programmer that the read/modify/write sequence did, in fact, occur as if it were atomic. This atomic property of a larx/stcx sequence can be used to implement a number of synchronization primitives well-known to those skilled in the art.

The larx/stcx sequence of operations work well with cache memories that are in close proximity with processors. However, the larx/stcx sequence of operations are not efficient for accessing a system memory, especially when many processors, which are located relatively far away from the system memory, are attempting to access the same memory block. Consequently, it would be desirable to provide a method and apparatus for supporting low-overhead memory locks for a system memory within a multiprocessor system.

SUMMARY OF THE INVENTION

In accordance with a preferred embodiment of the present invention, a lock control section is assigned to a data block within a system memory of a multiprocessor system. In response to a request for accessing the data block by a processing unit within the multiprocessor system, a determination is made by a memory controller whether or not the lock control section of the data block has been set. If the lock control section of the data block has been set, another determination is made by the memory controller whether or not the requesting processing unit is located beyond a predetermined distance from the memory controller. If the requesting processing unit is located beyond a predetermined distance from the memory controller, the requesting processing unit is invited to perform other functions; otherwise, the number of the requesting processing unit is placed in a queue table. However, if the lock control section of the data block has not been set, the lock control section of the data block is set, and the request for accessing the data block is allowed by the memory controller.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
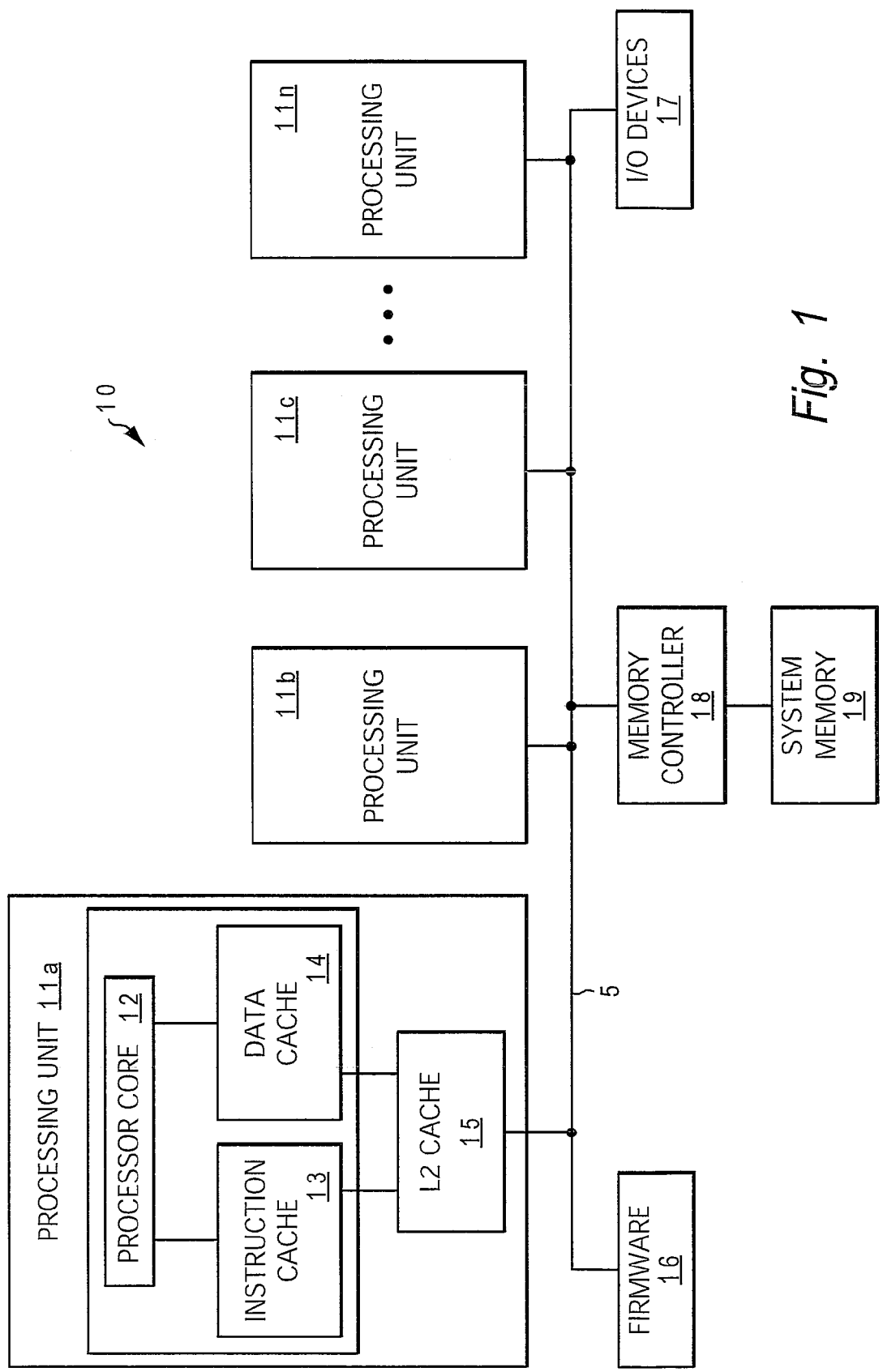
FIG. 1 is a block diagram of a multiprocessor system in which a preferred embodiment of the present invention is incorporated.

With reference now to the drawings, and in particular to FIG. 1, there is depicted a block diagram of a multiprocessor system in which a preferred embodiment of the present invention is incorporated. As shown, a multiprocessor system 10 includes multiple processing units, such as processing units 11a-11n, coupled to firmware 16, input/output (I/O) devices 17, and a memory controller 18 connected to a system memory 19. The primary purpose of firmware 16 is to seek out and load an operating system from one of I/O devices 17, such as a storage device. In addition to various storage devices, I/O devices 17 also include a display monitor, a keyboard, a mouse, etc. Processing units 11a-11n communicate with firmware 16, I/O devices 17 and memory controller 18 via an interconnect or bus 5.

Processing units 11a-11n, which may have homogeneous or heterogeneous processor architectures, use a common set of instructions to operate. As a general example of processing units 11a-11n, processing unit 11a includes a processor core 12 having multiple execution units (not shown) for executing program instructions. Processing unit 11a has one or more level-one caches, such as an instruction cache 13 and a data cache 14, which are implemented with high-speed memory devices. Instruction cache 13 and data cache 14 are utilized to store instructions and data, respectively, that may be repeatedly accessed by processing unit 11a in order to avoid long delay time associated with loading the same information from system memory 19. Processing unit 11a may also include level-two caches, such as an L2 cache 15 for supporting caches 13 and 14.

Figure 2:
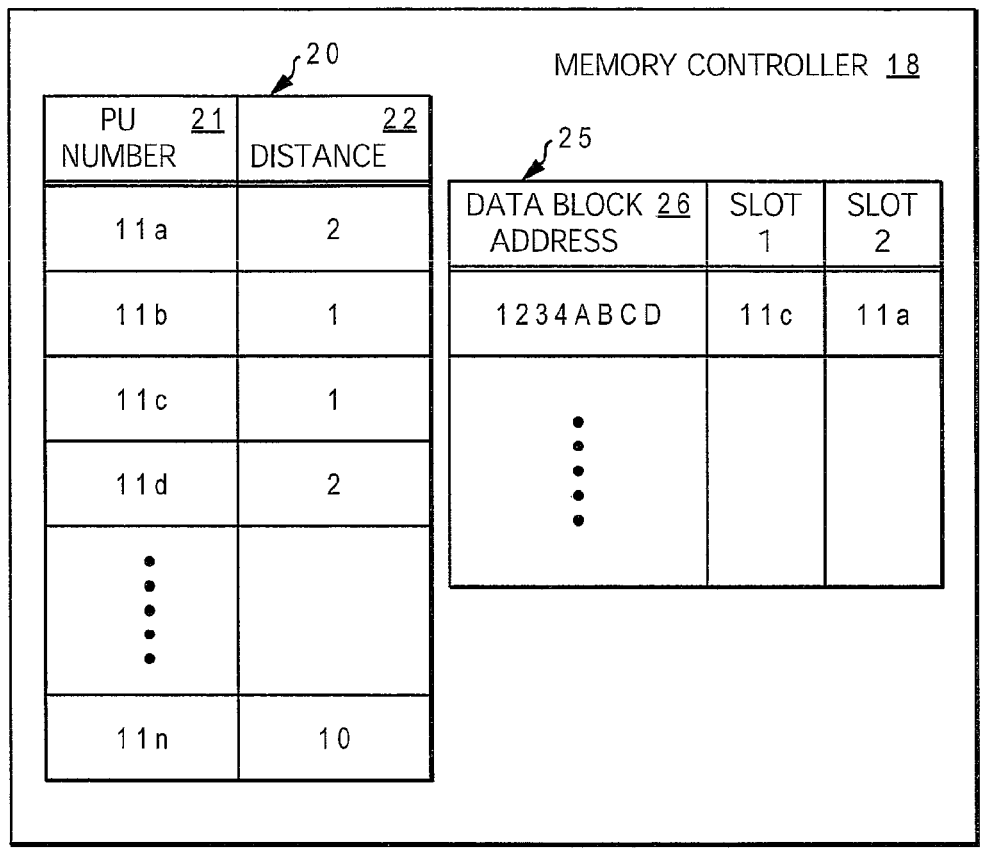
FIG. 2 is a block diagram of a memory controller within the multiprocessor system from FIG. 1, in accordance with a preferred embodiment of the present invention.

With reference now to FIG. 2, there is illustrated a block diagram of memory controller 18 from FIG. 1, in accordance with a preferred embodiment of the present invention. As shown, memory controller 18 includes a processing unit tracking table 20. Processing unit tracking table 20 contains three fields, namely, a processing unit number field 21, a distance field 22, and an order field 23. Each entry in processing unit number field 21 stores a processing unit number, and each corresponding entry in distance field 22 stores a number for indicating a relative distance of the associated processing unit from memory controller 18.

For example, as shown in FIG. 1, memory controller 18 is located between processing unit 11b and processing unit 11c on interconnect 5 from a relative physical distance point of view. Thus, both processing units 11b and 11c can be assigned as one distance unit from memory controller 18, as recorded in the second and third entries of distance field 22, respectively, within processing unit tracking table 20. Similarly, since processing unit 11a is located approximately one processor away from memory controller 18, processing unit 11a can be assigned as two distance units from memory controller 18, as recorded in the first entry of distance field 22 within processing unit tracking table 20. In the present example, processing unit 11n is located approximately nine processors away from memory controller 18 (which is furthest away from memory controller 18); thus, processing unit 11n can be assigned as ten distance units from memory controller 18, as recorded in the last entry of distance field 22 within processing unit tracking table 20.

Figure 3:
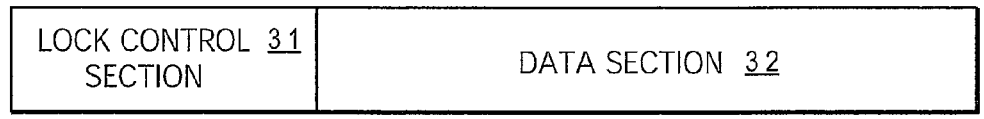
FIG. 3 is a block diagram of a data block in a system memory of the multiprocessor system from FIG. 1, in accordance with a preferred embodiment of the present invention.

Referring now to FIG. 3, there is illustrated a block diagram of a data block within system memory 19 from FIG. 1, in accordance with a preferred embodiment of the present invention. As shown, a data block 30 includes a lock control section 31 and a data section 32. Preferably, lock control section 31 is implemented with a first byte of data block 30 and data section 32 is the remaining bytes of data block 30. For example, if data block 30 is a 128-byte block, the first byte is implemented as lock control section 31, and the remaining 127 bytes are implemented as data section 32.

Lock control section 31 of data block 30 allows a memory controller, such as memory controller 18 from FIG. 1, to know whether or not data block 30 is currently being accessed by one of processing units within a multiprocessor system such that other processing units of the multiprocessor system are prevented from accessing data block 30. Data section 32 is configured to store data.

Figure 4:
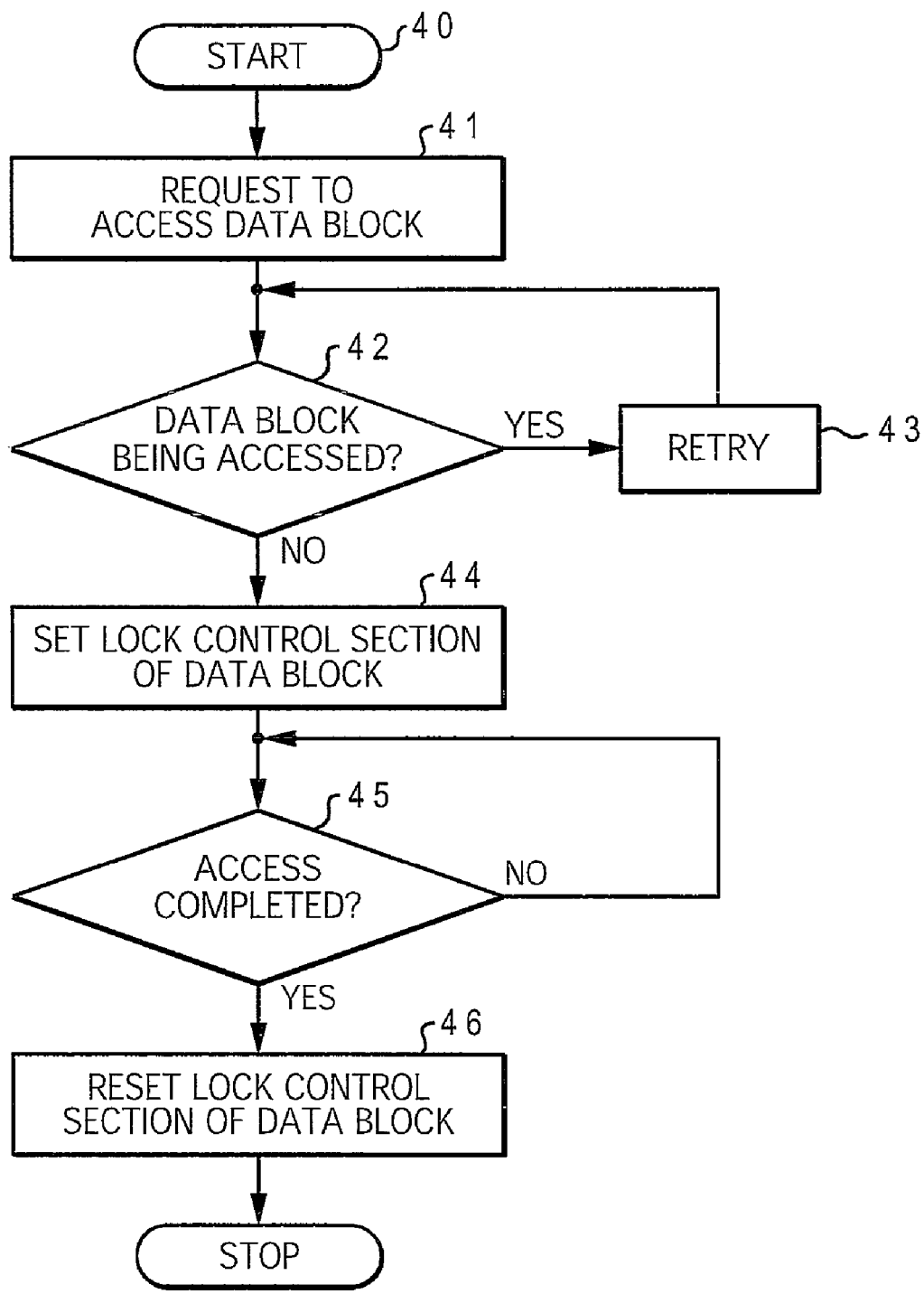
FIG. 4 is a high-level logic flow diagram of a method for supporting low-overhead memory locks within the multiprocessor system from FIG. 1, in accordance with a preferred embodiment of the present invention.

With reference now to FIG. 4, there is illustrated a high-level logic flow diagram of a method for supporting low-overhead memory locks within a system memory of a multiprocessor system, in accordance with a preferred embodiment of the present invention. Starting at block 40, in response to a request by a processing unit within a multiprocessor system (such as multiprocessor system 10 from FIG. 1) to access a data block within a system memory (such as system memory 19 from FIG. 1) of the multiprocessor system, as shown in block 41, a determination is made whether or not the requested data block is currently being accessed by another processing unit within the multiprocessor system, as depicted in block 42.

The request is preferably made by a requesting processing unit to a memory controller via a Memory-Lock Load instruction, which is distinguished from a conventional Load instruction. As will be explained below, the Memory-Lock Load instruction allows the memory controller to set a lock control section of the requested data block (such as lock control section 31 of data block 30 from FIG. 3) to lock the requested data block in order to prevent other processing units from accessing the requested data block.

The determination is preferably made by the memory controller via a checking of a lock control section of the requested data block. As shown in FIG. 3, the lock control section is located within the first byte of the requested data block for the present embodiment. Specifically, the lock control section can be implemented with the first bit of the first byte of the requested data block. For example, a logical "1" in the first bit of the first byte of the requested data block indicates that the requested data block is being accessed by another processing unit within the multiprocessor system. Otherwise, a logical "0" in the first bit of the first byte of the requested data block indicates that the requested data block is not being accessed by another processing unit within the multi-processor system, and is available for access.

If the requested data block is being accessed by another processing unit within the multiprocessor system, the requesting processing unit is not allowed to access the requested data block, and the requesting processing unit is invited to retry, as shown in block 43, and the process returns to block 42. Otherwise, if the requested data block is not being accessed by another processing unit within the multiprocessor system, the lock control section of the requested data block is set to a logical "1" to prevent other processing unit from accessing the requested data block, as depicted in block 44, and the requesting processing unit is allowed to access the requested data block.

After the access of the requested data block has been completed, as shown in block 45, the lock control section of the requested data block is reset to a logical "0" to allow other processing unit to access the requested data block, as depicted in block 46.

The requesting processing unit preferably signifies the completion of access to the memory controller via a Memory-Unlock Store instruction, which is distinguished from a conventional Store instruction. The Memory-Unlock Store instruction allows the memory controller to reset the lock control section of the requested data block (i.e., unlocking the requested data block) such that other processing units can access the requested data block again. After the requesting processing unit has initially gained control of the requested data block via a Memory-Lock Load instruction, the requesting processing unit can perform many Load or Memory-Lock Load instructions. However, the requesting processing unit can only perform one Memory-Unlock Store instruction for the memory controller to release the lock on the request data block.

Although it has been explained that the lock control section is to be implemented in the first bit of the first byte within a data block, it is understood by those skilled in the art that the lock control section can be implemented by more than one bit, and/or can be located anywhere within the first or other byte of a data block.

In block 43 of FIG. 4, the memory controller invites the requesting processing unit to retry when the requested data is already being accessed by another processing unit. However, instead of inviting the requesting processing unit to retry, the memory controller can ignore the access request from the requesting processing unit when the requested data is being accessed by another processing unit. Even with this ignore option from the memory controller, the requesting processing unit is still permitted to retry, and the request processing unit can retry the access request for the same data block at a later time.

When there are more than one processing units requesting for the same data block that is currently being accessed by another processing unit, instead of inviting all requesting processing units to retry, it may be more beneficial to inform a requesting processing unit located relatively far away from memory controller 18 to perform more useful operations other than retry. This is because the retry time is relatively long for requesting processing units that are located farther away from memory controller 18 than those that are closer. The relative distance of a requesting processing unit to memory controller 18 can be found in distance field 22 of processing unit tracking table 20 from FIG. 2. For example, when there are 10 processing units in a multiprocessor system, as an implementation policy, a requesting processing unit located more than five distance units away from memory controller 18 can be invited to perform other operations instead of performing retry. In the example shown in FIG. 2, memory controller 18 would invite processing unit 11*n* to perform other functions instead of retry when a data block requested by processing unit 11*n* is not readily available for access.

Alternatively, instead of inviting a requesting processing unit to retry, the memory controller can also place the access request from the requesting processing unit in a queue when the requested data is being accessed by another processing unit. Referring back to FIG. 2, memory controller 18 includes a queue table 25 having a data block address field 26 along with two queue slots, namely, slot 1 and slot 2. For example, if a data block having an address 1234ABCD is being accessed by processing unit 11*b* while processing unit 11*c* makes an access request to data block 1234ABCD, the processing unit number of processing unit 11*c* is placed in slot 1 along with the address of data block 1234ABCD being placed in an associated entry of data block address field 26 of queue table 25. Subsequently, if processing unit 11*a* makes an access request to data block 1234ABCD while data block 1234ABCD is still being accessed by processing unit 11*b*, the processing unit number of processing unit 11*a* is placed in slot 2 of the corresponding entry for data block 1234ABCD within queue table 25. After placing the processing unit number of a requesting processing unit in queue table 25, memory controller 18 may send an acknowledge signal back to the requesting processing unit such that the requesting processing unit does not attempt to retry the access request.

After processing unit 11*b* has completed its access to data block 1234ABCD, memory controller 18 will allow processing unit 11*c* to gain access to data block 1234ABCD, and the processing unit number of processing unit 11*a* will be moved from slot 2 to slot 1. Similarly, after processing unit 11*e* has completed its access to data block 1234ABCD, memory controller 18 will allow processing unit 11*a* to gain access to data block 1234ABCD, and the address of data block 1234ABCD along with the processing unit number of processing unit 11*a* will be removed from queue table 25. Although each entry of queue table 25 is shown to have a queue depth of two, it is understood by those skilled in the art that a queue depth of less or more than two is also permissible.

All of the above-mentioned options for handling data block access denial are implemented from the perspective of a memory controller, such as memory controller 18 from FIG. 2; however, it is also important to place certain controls on requesting processing units. For example, a timer can be set within a requesting processing unit after the requesting processing unit has been stalled from accessing a requested data block. Regardless of whether the requesting processing unit is invited to retry or placed in a queue table by a memory controller, the requesting processing unit can decide on its own not to access the requested data block anymore once the timer has timed out. As such, the requesting processing unit can retain some control in the process of accessing data blocks.

As has been described, the present invention provides a method and apparatus for supporting low-overhead memory locks within a system memory of a multiprocessor system.

While an illustrative embodiment of the present invention has been described in the context of a fully functional data processing system, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. Examples of the types of media include recordable type media such as thumb drives, floppy disks, hard drives, CD ROMs, DVDs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:
1. A multiprocessor system comprising:
 a plurality of processing units;
 a system memory includes a data block having a data section and a lock control section; and
 a memory controller for controlling said system memory, wherein said memory controller determines, in response to a request for accessing said data block by one of said processing units within said multiprocessor system, whether or not said lock control section of said data block has been set;

determines whether or not said processing unit is located beyond a predetermined distance from said memory controller when said lock control section of said data block has been set;

invites said processing unit to perform other functions if said processing unit is located beyond a predetermined distance from said memory controller;

places said processing unit in a queue table if said processing unit is not located beyond a predetermined distance from said memory controller; and sets said lock control section of said data block and allows said processing unit to access said data block when said lock control section of said data block has not been set.

2. The apparatus of claim 1, wherein said memory controller resets said lock control section of said data block in response to an access complete instruction from said processing unit.

3. The apparatus of claim 2, wherein said access complete instruction is a Memory-Unlock Store instruction.

4. The apparatus of claim 1, wherein said request is made via a Memory-Lock Load instruction.

* * * * *